United States Patent
Callahan (10) Patent No.: US 11,413,520 B2
(45) Date of Patent: *Aug. 16, 2022

(54) METHOD AND SYSTEM FOR A PERSONAL INTERACTION GAME PLATFORM

(71) Applicant: Michael Callahan, San Francisco, CA (US)

(72) Inventor: Michael Callahan, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/019,812

(22) Filed: Sep. 14, 2020

(65) Prior Publication Data

US 2020/0406126 A1    Dec. 31, 2020

Related U.S. Application Data

(63) Continuation of application No. 16/179,422, filed on Nov. 2, 2018, now Pat. No. 10,773,153.
(Continued)

(51) Int. Cl.
| | |
|---|---|
| *A63F 13/213* | (2014.01) |
| *A63F 13/25* | (2014.01) |
| *A63F 13/235* | (2014.01) |
| *A63F 13/42* | (2014.01) |
| *A63F 13/847* | (2014.01) |
| *A63F 13/212* | (2014.01) |
| *A63F 13/335* | (2014.01) |

(Continued)

(52) U.S. Cl.
CPC .......... *A63F 13/213* (2014.09); *A63F 13/212* (2014.09); *A63F 13/217* (2014.09); *A63F 13/235* (2014.09); *A63F 13/25* (2014.09); *A63F 13/335* (2014.09); *A63F 13/42* (2014.09); *A63F 13/65* (2014.09); *A63F 13/847* (2014.09); *A63F 13/87* (2014.09)

(58) Field of Classification Search
None
See application file for complete search history.

(56) References Cited

U.S. PATENT DOCUMENTS

| | | | |
|---|---|---|---|
| 7,413,513 B2 * | 8/2008 | Nguyen | G07F 17/3223 463/39 |
| 8,758,136 B2 | 6/2014 | Briggs | |

(Continued)

*Primary Examiner* — Ronald Laneau
(74) *Attorney, Agent, or Firm* — McAndrews, Held & Malloy, Ltd.

(57) ABSTRACT

Systems and methods are provided for a personal interaction game platform and may include, in a human-controlling gaming platform comprising a first communication device and a second communication device, each comprising a user input mechanism and a display: receiving commands in the first device via its user input mechanism; communicating the received commands to the second device; relaying the communicated commands to a user of the second device; sensing data regarding actions taken by the user of the second device in response to the relayed commands; and communicating the sensed data to the first device. The commands may be relayed to the user of the second device via an audio output. The commands may be relayed to the user of the second device via the display. One or more tactile sensors may be operatively coupled to the second device for sensing the data regarding actions of the receiver.

20 Claims, 3 Drawing Sheets

Related U.S. Application Data

(60) Provisional application No. 62/580,488, filed on Nov. 2, 2017.

(51) Int. Cl.
*A63F 13/65* (2014.01)
*A63F 13/217* (2014.01)
*A63F 13/87* (2014.01)

(56) References Cited

U.S. PATENT DOCUMENTS

| | | | |
|---|---|---|---|
| 8,838,060 B2 * | 9/2014 | Walley | G06F 3/033 455/403 |
| 2006/0287087 A1 | 12/2006 | Zalewski | |
| 2008/0207315 A1 | 8/2008 | Bloebaum | |
| 2011/0118030 A1 * | 5/2011 | Walley | G06F 21/32 463/37 |
| 2012/0108320 A1 | 5/2012 | Ye | |

\* cited by examiner

METHOD AND SYSTEM FOR A PERSONAL INTERACTION GAME PLATFORM

CROSS-REFERENCE TO RELATED APPLICATIONS/INCORPORATION BY REFERENCE

This application is a continuation of Unites States application Ser. No. 16/179,422 filed on Nov. 2, 2018, now U.S. Pat. No. 10,773,153, which claims priority to, and the benefit of, U.S. Provisional Application 62/580,488 filed on Nov. 2, 2017, each of which is hereby incorporated herein by reference in its entirety.

TECHNICAL FIELD

Aspects of the present disclosure relate to electronic gaming. More specifically, certain implementations of the present disclosure relate to methods and systems for a personal interaction game platform.

BACKGROUND

Conventional gaming platforms may be costly, cumbersome, and/or inefficient—e.g., they may be complex and/or time consuming.

Further limitations and disadvantages of conventional and traditional approaches will become apparent to one skilled in the art, through comparison of such systems with some aspects of the present disclosure as set forth in the remainder of the present application with reference to the drawings.

BRIEF SUMMARY

System and methods are provided for a personal interaction game platform, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1:
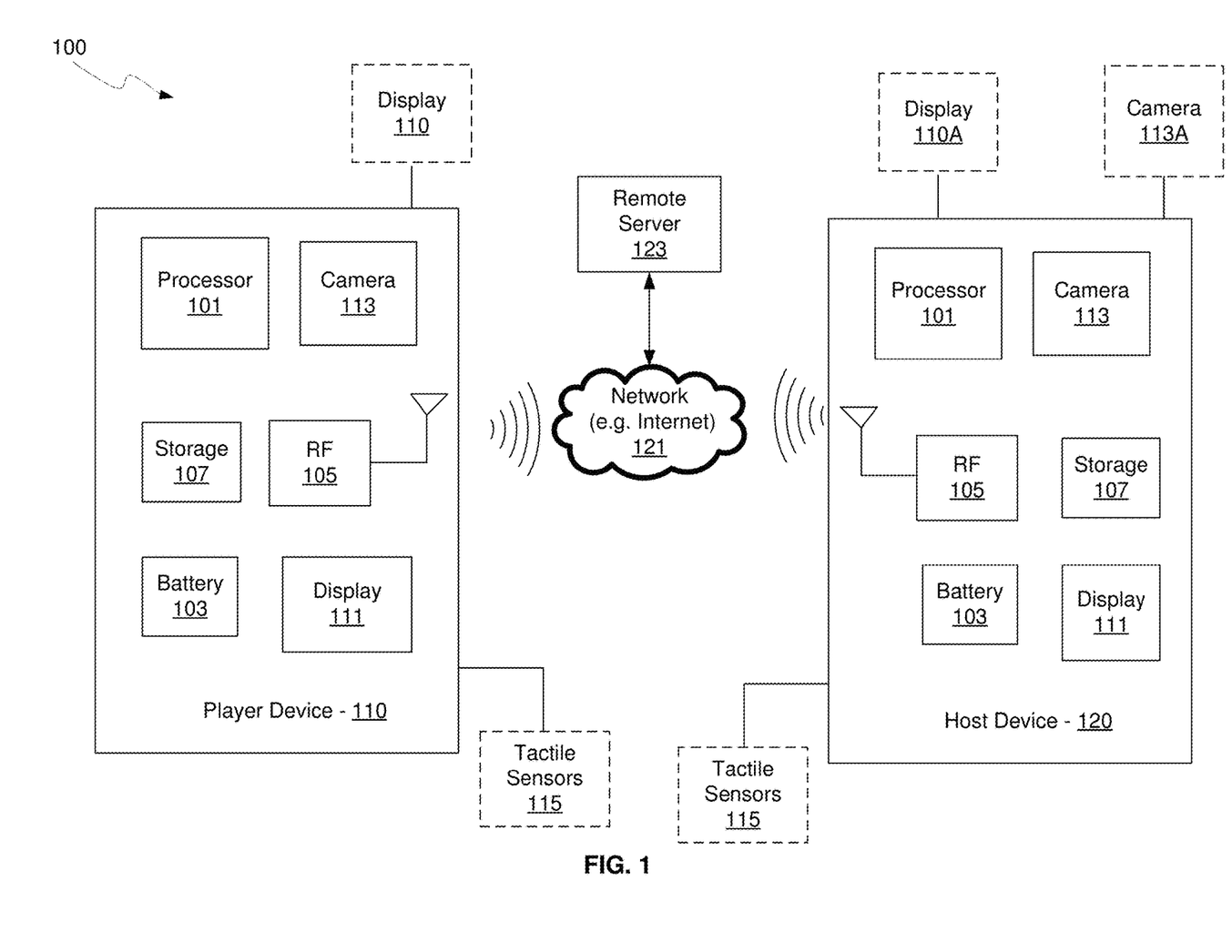
FIG. 1 is a diagram illustrating communication devices for a personal interaction game platform, in accordance with an example embodiment of the disclosure.

FIG. 1 is a diagram illustrating communication devices for a personal interaction game platform, in accordance with an example embodiment of the disclosure. Referring to FIG. 1, there is shown a personal gaming system 100 with a player device 110, a network 121, an optional remote server 123, and a host device 120. The player device 110 may comprise any device used for communication such as a cell phone, tablet, desktop computer, or laptop, for example, with computing and storage capability, although some of such capability may be performed by other devices in communication with the player device 110, while the host device may comprise a mobile device such as a cell phone, tablet, or laptop, for example, and may be coupled to optional display 111A, camera 113A, and tactile sensors 115, and/or other sensing and feedback equipment.

The player device 110 and host device 120 may each comprise a processor 101, a battery 103, a wireless radio frequency (RF) front end 105, storage 107, a display 111, and a camera 113.

The processor 101 may control the operations of the player device 110/host device 120, storing information in the storage 107, enabling communications via the RF front end 105, processing information received via a keyboard or other input mechanism, such as may be configured in the display 111, for example, and other suitable control operations for the player device 110/host device 120. The battery 103 may provide power for the player device 110/host device 120 and the storage 107 may comprise a memory device for storing information. In an example scenario, the storage 107 may store gaming functions, such as command structures for the user of the player device 110/host device 120. The storage 107 may also store photos and/or videos taken by the camera 113.

The RF front end 105 may comprise suitable circuitry for communicating wirelessly with other devices via one or more networks, such as the network 121. The RF front end 105 may therefore communicate utilizing various communications standards, such as GSM, CDMA, LTE, WiFi, Bluetooth, Zigbee, etc., and therefore may comprise one or more antennae, filters, amplifiers, mixers, and analog-to-digital converters, for example.

The camera 113 may comprise one or more imaging sensors and optics for focusing light onto the sensors, and may be operable take pictures and video through operation of the user of the player device 110/host device 120. The host device 120 may also comprise an external camera 113A, such as a small portable camera mounted on the body of the user of the host device 120, hereinafter referred to as the host, to enable a first-person view of gaming activities. In an example scenario, the camera 113A may take video that may be communicated to the player device 110 such that its user, hereinafter referred to as the player, may be presented with the environment in which the user of the host device 120 is located. Similarly, the optional displays 111A may comprise a headset display for providing optical information to the player and/or host. Multiple external cameras may be affixed to other devices such as tripods, walls, airborne drones, robots, other people, and/or other stationary and mobile items. The camera information can be augmented with additional information synthesized by a computer. In an example scenario, the camera has infrared camera capabilities and captures information used to estimate the pose of the host and control the rig of a 3D character.

The tactile sensors 115 may be pressure sensitive sensors and actuators that may be operable to provide tactile feedback to the player and/or host. For example, the tactile sensors may comprise micro-electro-mechanical system (MEMS) devices that sense the motion of the player's hand to provide a motion command to the host. In addition, the host's tactile sensors may sense via pressure sensors that the host has touched an object and actuators in the player's tactile sensor may provide pressure to the player's hand in that location to provide tactile feedback. Other examples of sensors in the tactile sensors 115 may include temperature sensors, light sensors, moisture sensors, etc., where the sensing is intended to mimic as much as possible of the host's environment.

The network 121 may comprise any communication system by which the devices communicate with other devices, such as the remote server 123 and the host device 120. As such, the network 121 may comprise the Internet, a local WiFi network, one or more cellular networks, etc.

The remote server 123 may comprise a computing device or devices for assisting in gaming functions between the host device 120 and the player device 110. The remote server 123 may be optional in instances when gaming databases, commands, or functions are stored locally on the player device 110 and/or the host device 120.

A multiplayer game played over the network 121 can be implemented using several different approaches, which can be categorized into two groups: authoritative and non-authoritative. In the authoritative group, a common approach is the client-server architecture, where a central entity, such as the remote server 123, controls the whole game. Every client connected to the server receives data, locally creating a representation of the game state on their device. If a host or player performs or requests an action, such as moving from one point to another, that information is sent to the remote server 123. The server 123 may check whether the information is correct, e.g., did the host move to a stated location, then updates its game state. After that, it propagates the information to all clients, so they can update their game state accordingly. In the non-authoritative group, there is no central entity and every peer (game) controls its game state. In a peer-to-peer (P2P) approach, a peer sends data to all other peers and receives data from them, assuming that information is reliable and correct. In the present example shown in FIG. 1, each of the player and host would be sending data to the other.

In an example scenario, the host may have the host device 120 mounted on their body in some way, such as with a headset or harness, and/or may include the camera 113A and/or the display 111A external to the host device 120 mounted to the host, for hands free operation and first-person view for the player during gaming. The user of the player device 110 may issue commands to the user where the host device 120 is at a remote location from the player device 110, connected via one or more communication networks, such as the network 121. The host device may be manned or unmanned as is the case where the host device is autonomous and/or robotic.

The commands may be communicated via various techniques other than verbal. For example, different tones may be utilized for instructing the user of the host device 120 to move in different directions, or perform an action, such as pick up or drop an object. In another example scenario, textual or other communicative symbols may be displayed on the display 111A and/or the display 111 of the host device 120 to provide commands to the user of the host device 120. The gaming commands and actions are described further with respect to FIGS. 2 and 3. These commands may also be transmitted to feedback devices of the host including pressure inducers, motors, or direct brain stimulation.

Similarly, the user of the player device 110, or player, may communicate instructions verbally, textually, or graphically through the use of a microphone, touchscreen, keyboard, and/or brain recording device for example, although other inputs may be utilized, such as a joystick, trackpad, or game controller.

Figure 2:
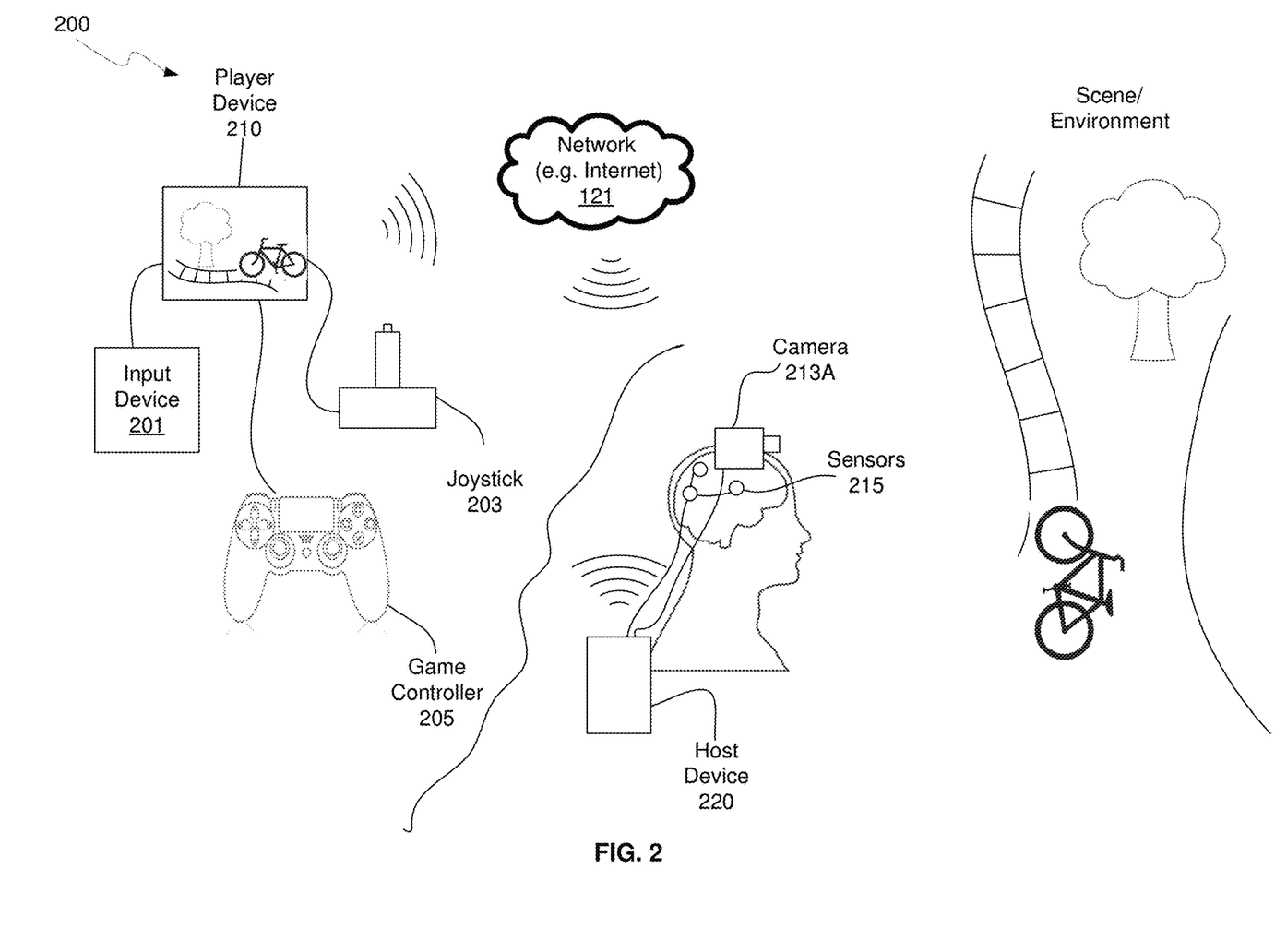
FIG. 2 illustrates a personal interaction game platform, in accordance with an example embodiment of the disclosure.

FIG. 2 illustrates a personal interaction game platform, in accordance with an example embodiment of the disclosure. Referring to FIG. 2, there is shown humaning game platform 200 comprising a player device 210, a host device 220, and network 121. The player device 210 is shown with an input device 201, joystick 203, and a game controller 205, although other accessories are possible. There is also shown host device 220 with a mounted camera 213A and sensors 215. The player device 210 and host device 220 may share any and all features of the player and host devices described with respect to FIG. 1.

The sensors 215 may be similar to the tactile sensors 215, and in this example are shown as attached to the host's head. In this example, various aspects of the host's environment and person may be sensed, such as temperature, sound, sweat, and even brain waves using EEG-type sensors, for example. Sensors may also be mounted elsewhere on the host's body for sensing movement, for example.

The term "humaning" from "human" and "gaming" is a gaming platform where a person may control another person like one would do in a video game. In this manner, reality is mixed with gaming or a digital gaming experience. Video games continue to become more lifelike and true to physics with improved graphics and processing capability. However, in a humaning environment, the graphics and physics are exact, as they are in the real world, because it takes place in the real world at least from the perspective of the host. Furthermore, the simulated intelligence of a character that is sought after in video game design is inherent in humaning environment because real humans are involved.

A main component of a humaning game platform is low latency video, where it synthesizes and transfers experiences as they occur without delay or glitchiness. In addition, a more direct connection to the brain may be utilized, with virtual reality an intermediate step between these two levels of experience. An objective is to provide as rich an experience as possible, with video, sound, tactile, and even mental impacts/effects.

Other main components of humaning are the host and player, where the host agrees to be controlled or is autonomous and the player uses various levels of controls to do so. Feedback comprises, at least, audio/video but may also include other visual and/or textual inputs.

The commands in a humaning platform may be bidirectional—in that the player can control the host directionally, using a smart phone, drone, GoPro, infrared camera, etc. . . . with live video streamed to the player with a controller, such as a joystick, game controller, or a directional pad. The commands may be transmitted to the host with visual, audible, or tactile feedback. In an example scenario, the host may wear a headset with audio, visual, and tactile inputs and outputs. Verbal instructions may be overlaid with specific tones in audible 3D space to indicate direction using time delays in left/right channels. Tones may also be associated with different instructions, such as "pick up," "open," or "close," for example. Feedback may also be directly or indirectly communicated with the brain via targeted stimulation.

For visual feedback, instructions or directions may be displayed on the hosts display screen, a 3D arrow, or an arrow with text, for example. A tone or visual indicator may be used to teach the host certain commands so that they become more learned. Tactile feedback may be used so doesn't require sound or video for control. It is preferable to have the host perceive commands but without affecting the host's experience.

The phone/camera/etc. may be affixed or hovering above the host, such as with a drone. The player ultimately has a mental connection, inciting particular parts of the brain. In one embodiment, the game platform at the player end comprises one or more displays, speakers, and controls, allowing for frequently used instructions to be faster. Directional controls are an example of high frequency controls, which thus require as simple an interface as possible. Buttons for a momentary form of communication may be utilized, with sensitivity to control an amount, and a latching mechanism. Also a spot on the button to indicate direction may be utilized. For example, a player may press the top of a button to indicate to the host to move forward, and other characteristics of the motion may be used to indicate a speed, such as by swiping quickly upward to indicate to the host to run. Rotating cameras, 360° cameras, or a neural network capable of synthesizing views can also be used to allow real-time perspective changes without requiring the movement of the host. In a seamless embodiment, direct brain stimulation is used for transmitting visual stimuli and feedback control.

A "Do" button, in the joystick 203 or other control such as the input device 201 or the game controller 205, may be utilized for the most logical action presented, such as to open a door or push a crosswalk button that the host has approached. This provides instructional compression, which frees the player from using a cumbersome interface for high frequency instructions. However, this can lead to frustration where the desired action is not the first logical action, such as where the player wanted the door locked instead of opened. For these situations, a "?" Button may be utilized to open up an audio dialog or a menu of possible actions, for example.

The player can use the action buttons in various ways to quickly communicate their intent. The player can press and hold the "Do" button to access richer commands. The game platform should not limit what the player can do and accessing these commands can be cumbersome. Therefore, categorizing and sub-setting of commands may be utilized. Categorizing comprises selecting one selectable aspect that then opens up a list of possible actions for that aspect. For example, a body part, such as a hand, may be tapped on the screen, which then opens up options such as throw, grab, or push, and selecting a foot may open up a list of options such as jump, kick, or walk. Also, categories may be alphabetical, with the actions sorted by letter, but not limited to these forms of categorization.

Motions may be utilized by the player to indicate actions to the host, such as a swipe indicating a desired throw or jump, for example. Emojis may be utilized to indicate an emotional state.

Sub-setting may comprise bringing up a subset of options when presented with an object or location. For example, upon approaching a door, a list of actions relating to the door may be provided to the player. Object recognition in the game platform 200, in the player device 210 and/or host device 220, or a remote device, may be utilized to detect such structures. A dataset connects objects to actions and supplies them to the player. Alternatively, the player may tap an object on the screen, which then provides a list of options. Also, atypical or nonsensical actions may be included for entertainment purposes, such as for example smelling a door. A random button may be included for random actions that may be selected by the player for the host.

Moderation of the actions may be used to prohibit anything unlawful, uncomfortable for the host, improper, or against societal norms, for example. In addition, the host may have a reject button or similar input to indicate to the player that the they do not want to, or cannot, take the requested action. If a player continues to request improper actions, they may be banned from the game, and proper behaviors may be encouraged with incentives.

Customizing controls—controls may be customized depending on the style of game play, in that the number of commands that can be captured, as well as rate of interaction, may be configured depending on the action of the game. For example, a sports game has a high rate of action, so controls need to be in front of player with no room for a menu or slow actions. So, in that style, for example, two buttons for left and right and a combined directional control for different punches in a boxing or martial arts type of game. This is in contrast to a strategy game, like escaping from a room with puzzles to solve with non-intuitive objects, meaning less of a requirement for fast controls but with more breadth of controls.

Action sub-setting—more in-depth actions. An adventure game is an example of using sub-setting—a movement, attack, and a pickup action, and then maybe "use" of what was picked up, such as a key that was picked up can then be used to unlock a door, for example.

Options for style of game play, such as camera angles and camera positioning for streamed embodiments are having the camera face outward, toward the person, split screen, multi-camera viewing that switches to other cameras, or drone based cameras, for example.

Set design—the range from physical world to digital world—the humaning platform may mostly be in the real world but with digital world additions. A living room may be used as a boxing ring, for example, but with the ropes superimposed on the screen. Physical objects may be placed in the area in preparation of a game and digital set design would mean placing objects visually in the real world based on location, for example, scene recognition, GPS or other geolocation technology, etc. Other embodiments comprise a digital key or coin, base, or goal to reach. With real time video processing, the system may take the input video and stylize as the player desires—change the walls, to put the host in a comic book setting, etc.

State triggering—a special command may be available on either the host or the player side where, for example, a player may want to make a sudden and unexpected change to the state of the game, so a special command may be available for such a change. For example, if the host thought the game had been too uneventful and wanted a dragon to pop out, they could press a button relating to state triggering, and a dragon appears.

Changing the game state, for example to change levels, is accomplished either automatically, and/or user initiated. Automatic game state changes can occur based off of gaming metrics like number of points, host location, time remaining, number of players, upon accomplishing of goals, etc. User initiated state changes can require input from either the player or the host via a button, command or other form of input. Both user initiated and automatic state changes can also occur simultaneously such as when a player enters a location and the host decides to advances the gaming narrative to the next phase.

With respect to the application interface, the fundamental parts of this interface are the host interface and a marketplace where a user can select what game they want to play. Capabilities may be optimized for the experience of the players and the host. A user may see games, ratings, previews, screenshots, and may allow for game suggestions from players or hosts, that can then be filled by hosts, and include payment structures, suggested by the marketplace.

Costume play may be incorporated into the ecosystem for people that like to dress up as comic book characters, animals, etc. and the system allows them to be that character. Alternatively, the host's appearance may be enhanced with digital characteristics like outfits, weapons, etc. as seen by the player on the player device 210.

Scoring may be based on the objective of the game and can be triggered by the host themselves, the player, other players, or automatically detected.

In addition to gaming, the ecosystem can request or control an action that the player would like, but can be more utilitarian instead, such as in a delivery or pick up something at a store for them. For example, a player may direct a host through a store or shopping mall, to one or more desired objects, or imply to browse through the store or stores. This may be particularly useful for persons that have limited mobility. Special projects—someone needs to people watch for marketing purposes and can send one or more hosts over to a mall, for example, to observe shopping activities at a particular store.

The gaming platform also has therapeutic purpose. For example, people that suffer from certain psychological conditions where social situations create a lot of anxiety, may be helped by controlling another person while still in a safe isolated environment, so that they may build experience with social interaction. Also depressed individuals may benefit from the interactions enabled by humaning through positive and entertaining interactions with others.

In operation, a host may wear and/or carry the host device 220, camera 213A, and sensors 215 while in a scene or environment, as shown in FIG. 2. The visual and physical aspects of the scene may be captured and/or sensed by the host device 220, camera 213A, and sensors 215 to be communicated to the network 121 to the player device 210. The player may control the host using the player device 210 and input device 201, joystick 203, and/or game controller 205. As the host encounters structures and/or people in their environment, the player may dictate responses to the host using the device player and communicated to the host device 220 via the network 121.

Commands may include positional change instructions or specific actions to be taken by the host, such as moving in a desired direction at a desired speed, pick up an object, or speak to another person nearby, for example. Audible and/or visual commands may be utilized to provide these commands to the host. An audio/visual command may comprise, for example, an image of the scene being displayed on the host device 220 with a target location marked and an audio command may be played "Ride the bike to the tree while singing your favorite song." The host may then, assuming these actions are within the established guidelines, take these actions, with video captured by the camera 213A being displayed on the player device and audio of the host singing captured by one or more microphones in the host device 220 being played on the player device 210. Once this action is performed, points may be awarded, which may be accrued until a level is reached and different actions may then become available, for example. If the commands made by the player are not within guidelines, for example if the bicycle is not owned by the host and the action could be considered theft, the host may indicate to the player that the command is rejected.

The network 121 provides communication between the player device 210 and the host device 220 and may include one or more cellular services and one or more Wifi networks, for example, for communicating over the Internet between devices. Accordingly, the network 121 provides a communication path for audio/visual data, as well as sensor and text data between devices.

Figure 3:
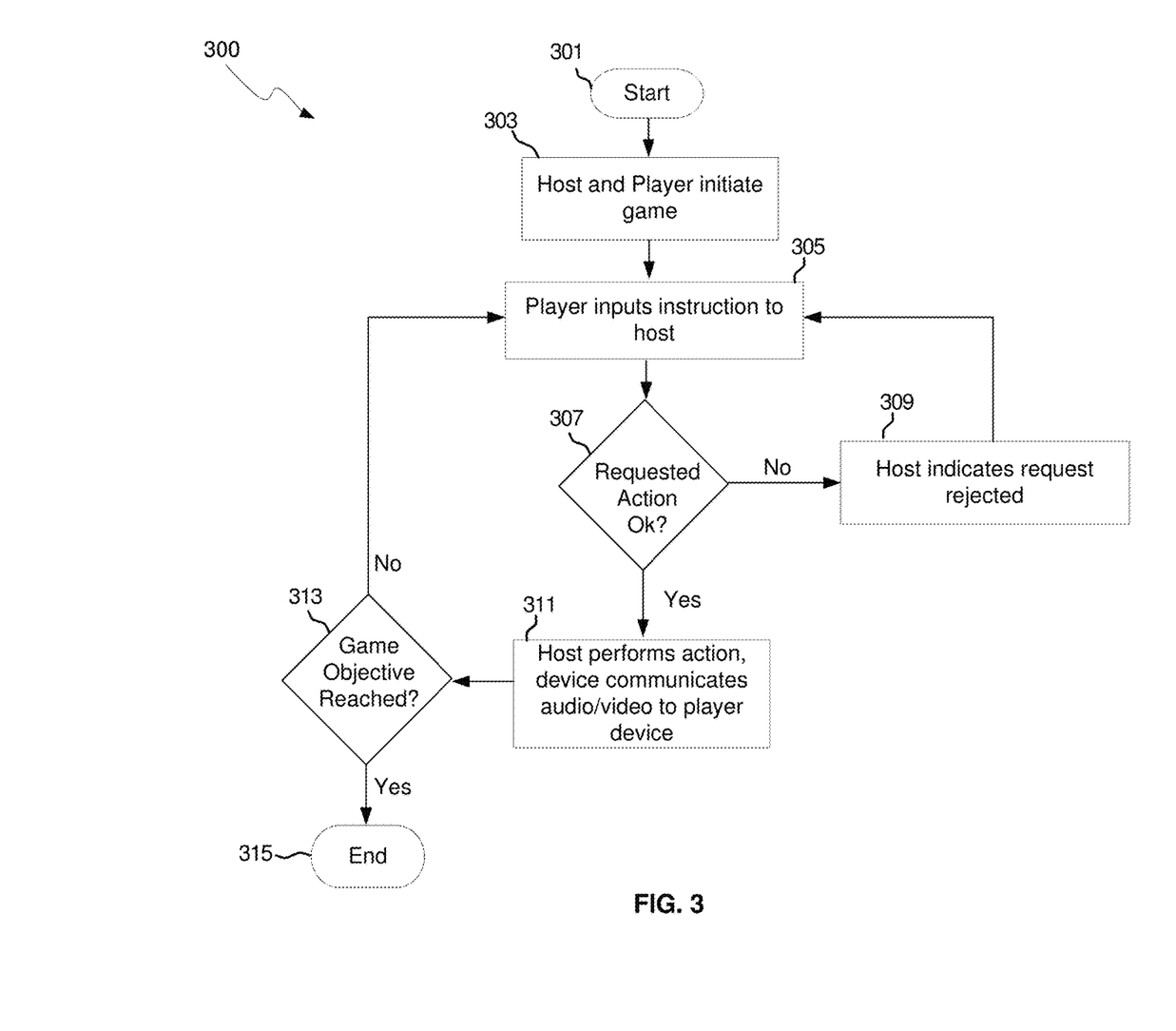
FIG. 3 is a flow chart for a personal interaction game platform, in accordance with an example embodiment of the disclosure.

FIG. 3 is a flow chart for a personal interaction game platform, in accordance with an example embodiment of the disclosure. Referring to FIG. 3, there is shown process flow 300 starting with start step 301 followed by step 303 where a host and a user agree to a humaning game. Once started, the player inputs one or more instructions to the host in step 305. If, in step 307, the requested action is not prohibited and is otherwise acceptable to the host, the process continues in step 311, where the host performs the action. The host device may send audio/video and other sensor data to the player device via the network so that the player experiences as much of the scene as possible. If, in step 307, the player instruction is prohibited, not possible, or otherwise not acceptable to the host, a rejection indication may be communicated to the player moving back to step 305, where one or more different instructions may be input. The player can request again and/or make an offer in order to get the action performed which may include a financial payment.

If after step 311, in step 313, the game objective has not been reached, the example steps proceed back to step 305 for more inputs, but if the game objective has been reached, the process ends at step 315.

In an example embodiment of the disclosure, a method and system are described for a personal interaction game platform and may include, in a human-controlling gaming platform comprising a first communication device and a second communication device, each comprising a user input mechanism and a display: receiving commands in the first communication device via its user input mechanism; communicating the received commands to the second communication device; relaying the communicated commands to a user of the second communication device; sensing data regarding actions taken by the user of the second communication device in response to the relayed commands; and communicating the sensed data to the first communication device.

The commands may be relayed to the user of the second communication device via an audio output. The commands may be relayed to the user of the second communication device via the display. One or more tactile sensors may be operatively coupled to the second communication device for sensing the data regarding actions of the receiver. Data from the tactile sensors coupled to the second communication device may be communicated to tactile sensors in the first communication device. The sensed data may comprises video, which may be captured by a camera worn by the user of the second communication device. The user input mechanism for the first communication device may comprise a game controller or joystick. The first communication device may be used to control a user of the second communication device. The display may comprise a touchscreen display that provides the user input mechanism for a corresponding communication device.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for gaming, the method comprising:
   in a human-controlling gaming platform comprising a first communication device and a second communication device remotely located from the first communication device, each comprising a user input mechanism and a display:
   receiving commands in the first communication device via its user input mechanism;
   wirelessly communicating the received commands to the second communication device;
   relaying the communicated commands to a user of the second communication device using audio and/or video information generated by the second communication device;
   sensing data regarding actions taken by the user of the second communication device in response to the relayed commands using one or more of a camera and a microphone in and/or coupled to the second communication device; and
   wirelessly communicating the sensed data to the first communication device.

2. The method according to claim 1, comprising relaying the commands to the user of the second communication device via an audio output.

3. The method according to claim 1, comprising relaying the commands to the user of the second communication device via the display.

4. The method according to claim 1, wherein one or more tactile sensors is operatively coupled to the second communication device for sensing the data regarding actions of the receiver.

5. The method according to claim 4, wherein data from the tactile sensors coupled to the second communication device is communicated to tactile sensors in the first communication device.

6. The method according to claim 1, wherein the sensed data comprises video.

7. The method according to claim 6, wherein the video is captured by a camera worn by the user of the second communication device.

8. The method according to claim 1, wherein the user input mechanism for the first communication device comprises a game controller or joystick.

9. The method according to claim 1, wherein the first communication device is used to control a user of the second communication device.

10. The method according to claim 1, wherein the display comprises a touchscreen display that provides the user input mechanism for a corresponding communication device.

11. A system for communication, the system comprising:
    a human-controlling gaming platform comprising a first communication device and a second communication device, each comprising a user input mechanism and a display, the human-controlling gaming platform being operable to:
    receive commands in the first communication device via its user input mechanism;
    wirelessly communicate the received commands to the second communication device;
    relay the communicated commands to a user of the second communication device using audio and/or video information generated by the second communication device;
    sense data regarding actions taken by the user of the second communication device in response to the relayed commands using one or more of a camera and a microphone in and/or coupled to the second communication device; and
    wirelessly communicate the sensed data to the first communication device.

12. The system according to claim 11, wherein the human-controlling gaming platform is operable to relay the commands to the user of the second communication device via an audio output.

13. The system according to claim 11, wherein the human-controlling gaming platform is operable to relay the commands to the user of the second communication device via the display.

14. The system according to claim 11, wherein one or more tactile sensors is operatively coupled to the second communication device for sensing the data regarding actions of the receiver.

15. The system according to claim 14, wherein data from the tactile sensors coupled to the second communication device is communicated to tactile sensors in the first communication device.

16. The system according to claim 11, wherein the sensed data comprises video.

17. The system according to claim 16, wherein the video is captured by a camera worn by the user of the second communication device.

18. The system according to claim 11, wherein the user input mechanism for the first communication device comprises a game controller or joystick.

19. The system according to claim 11, wherein the first communication device is used to control a user of the second communication device.

20. A system for communication, the system comprising:
    a human-controlling gaming platform comprising a first communication device and a second communication device remotely located from the first communication device, each comprising a user input mechanism and a display, the human-controlling gaming platform being operable to:
    receive commands in the first communication device via its user input mechanism;

wirelessly communicate the received commands to the second communication device;
relay the communicated commands to a user of the second communication device using audio and/or video information generated by the second communication device;
sense video data regarding actions taken by the user of the second communication device in response to the relayed commands using one or more of a camera, a microphone, and tactile sensors in and/or coupled to the second communication device; and
wirelessly communicate the sensed video data for display by the first communication device.

* * * * *